Aug. 29, 1933.  A. N. GUSTINE  1,924,495
LIQUID DEPTH INDICATOR
Filed May 28, 1928
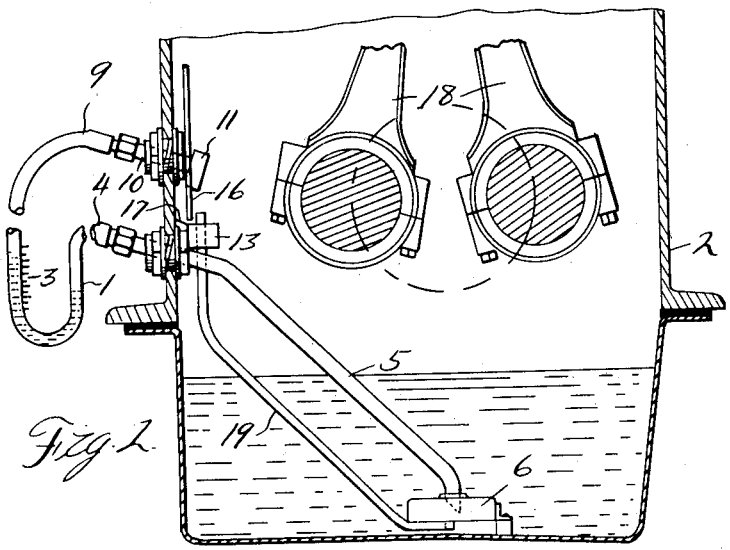
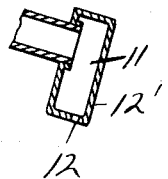
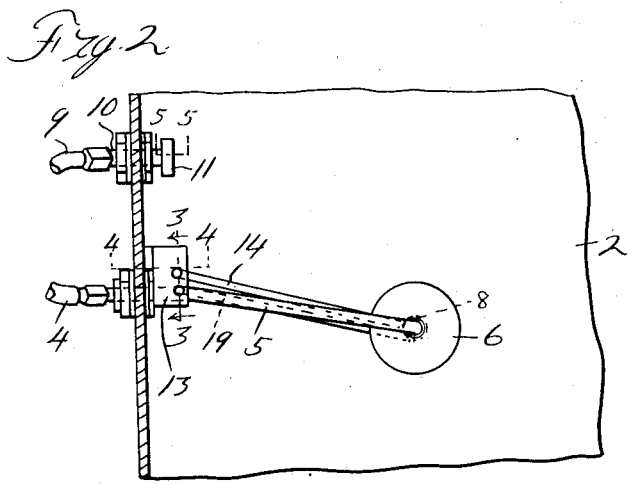
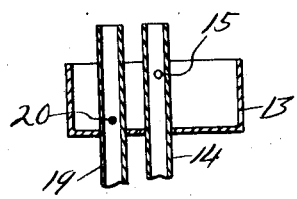
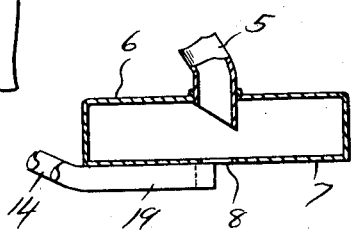
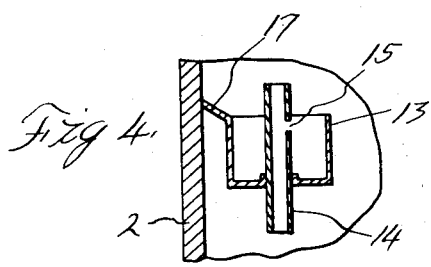
Inventor
Arthur N. Gustine Patented Aug. 29, 1933

1,924,495

UNITED STATES PATENT OFFICE 1,924,495

LIQUID DEPTH INDICATOR

Arthur N. Gustine, Ann Arbor, Mich., assignor to King-Seeley Corporation, Ann Arbor, Mich., a corporation of Michigan Application May 28, 1928. Serial No. 281,339

11 Claims. (Cl. 73—54)

The invention relates to liquid depth indicators and refers more particularly to devices for indicating the depth of oil in engine crank cases. One of the objects of the invention is to provide an improved device which is automatically replenished with air during the operation of the engine. Another object is to so construct the device that it may depend upon the oil thrown by a moving part of the engine for the replenishment of its air supply. A further object is to so construct the device that the air is automatically replenished after the engine has stopped running and had an opportunity to cool. With these as well as other objects in view, the invention resides in the novel features of construction and combinations and arrangements of parts as more fully hereinafter set forth.

In the drawing:—

Figure 1 is a side elevation of an oil depth indicating device embodying the invention;

Figure 2 is a plan view thereof;

Figures 3, 4 and 5 are cross sections respectively on the lines 3—3, 4—4 and 5—5 of Figure 2.

Figure 6 is a section through the bell.

The depth indicating device embodying the invention is designed particularly for use in an internal combustion engine to indicate the depth of oil in the crank case. 1 is a U-shaped hydrostatic pressure gauge which is preferably mounted upon the dash of a vehicle, which is adapted to be propelled by an internal combustion engine having the crank case 2. This gauge is provided with suitable graduations 3 for indicating the depth of oil in the crank case or, if desired, the quantity. 4 is a pressure transmitting conduit extending from one leg of the gauge through a side wall of the crank case and downwardly into the oil, this conduit having an opening at its lower end and preferably near the bottom of the crank case for placing the conduit in communication with the oil at a suitable pressure transmitting level. This conduit includes the pipe 5 which extends through a side wall of the crank case and the bell or chamber 6 through the top of which the pipe extends air tight. This bell forms an air chamber and has the bottom wall 7 which is provided with a central opening 8. 9 is a pressure equalizing conduit extending from the other leg of the gauge to the crank case above the oil. This conduit includes the pipe 10 which extends through a side wall of the crank case and a chamber 11 at the inner end of the pipe. This chamber is provided with the opening 12, which is preferably restricted, in its lower side, its inner side being closed by the wall 12'. With this arrangement oil is prevented from entering the pipe 10 and destroying or impairing the efficiency thereof.

For the purpose of replenishing the pressure transmitting conduit 4 with air so that the gauge will give the proper reading there is the receptacle 13 having an open upper end and the pipe 14 which has an open upper end above the upper edge of the receptacle 13 and a lower open end adjacent the opening 8 in the bottom wall of the bell. This pipe extends air tight through the bottom of the receptacle and has the restricted opening 15 which is located within the receptacle slightly below its upper edge. 16 is a pipe having the upper end thereof communicating with a lubricant collecting or distributing means (not shown) and the lower end arranged directly above the receptacle 13 for conducting oil to the latter. The device is also constructed so that the replenishment of the air supply need not depend upon the oil flowing through the pipe 16. As shown, the receptacle 13 is secured to a side wall of the crank case 2 and the wall of this receptacle adjacent the side wall of the crank case has at its upper edge the inclined portion 17 which contacts with the side wall of the crank case and directs oil flowing down this crank case side wall into the receptacle. This oil during the operation of the engine is elevated from the body of oil in the crake case by the connecting rods 18 and thrown against the crank case side walls as well as the cylinder walls.

In operation and while the engine is running oil is forced through the pipe 16 and also splashed against the side walls of the crank case and the oil flowing through the pipe 16, as well as the oil upon the portion of the crank case side wall above the receptacle 13 flows into this receptacle and then partly through the opening 15 in the pipe 14 and partly through an opening 20 formed in a pipe 19 the purpose of which will be more fully hereinafter described. This oil in flowing through the openings 15 and 20 and down through the pipes 14 and 19 draws air in through the open upper end of the pipes 14 and 19 and carries this air downwardly through the pipes 14 and 19 and discharges the same at the opening 8 in the bottom of the bell so that the air is free to move upwardly into the bell and displaces any oil therein. It will thus be seen that during the operation of the engine the pressure transmitting conduit is continuously replenished with air.

For the purpose of replenishing the air supply after the engine has stopped running and had an opportunity to cool so that the gauge will give an accurate reading another pipe 19 similar to the pipe 14 is provided. This pipe 19, however, has its restricted opening 20 located adjacent the bottom of the receptacle 13 so that after the engine has stopped running and oil is no longer fed to the receptacle 13 the oil in the receptacle 13 gradually drains out through the opening 20 and the pipe 19, during the latter portion of which air entering through the open upper end of the pipe 19 is carried by the oil passing through the opening 20 downwardly through this pipe and discharged below the opening 8 in the bottom wall of the bell. The sizes of the receptacle 13 and opening 20 are such that an appreciable time interval of approximately fifteen minutes, for example, is required to drain the receptacle so that the engine has had an opportunity to cool and consequently the air in the pressure transmitting conduit has also had an opportunity to cool and contract before the pressure transmitting conduit has been replenished with air.

What I claim as my invention is:

1. A device for indicating the depth of oil in an engine crank case and having a pressure gauge above the normal level of oil in the crank case, a pressure transmitting conduit extending downwardly from said gauge into the oil in the crank case and having an opening at its lower end for placing said conduit in communication with the oil at a pressure transmitting level, a receptacle within the crank case at an elevation above that of the free surface of the oil and having an opening in its upper portion for receiving oil when the oil is agitated during the operation of the engine and a second conduit extending from said receptacle and having an opening within the receptacle for the passage of oil, an opening above said first-mentioned opening for the passage of air and an opening at its lower end below the pressure transmitting level and arranged with respect to said pressure transmitting conduit so that air passing through said second conduit may enter said pressure transmitting conduit.

2. A device for indicating the depth of oil in an engine crank case and having a pressure gauge above the normal level of oil in the crank case, a pressure transmitting conduit extending downwardly from said gauge into the oil in the crank case and having an opening at its lower end for placing said conduit in communication with the oil at a pressure transmitting level, and means dependent upon the operation of a movable part of the engine for constantly replenishing said pressure transmitting conduit with air, said means comprising a receptacle having an opening in its upper end and said receptacle being within the crank case above the free surface of the oil and arranged to catch oil discharged by the movable part of the engine.

3. A device for indicating the depth of oil in an engine crank case and having an air chamber within said crank case and communicating with the oil at a pressure transmitting level, a pressure gauge, a pressure transmitting conduit in communication with said gauge and the upper portion of said air chamber, a receptacle within said crank case and above the free surface of the oil and having an open top for receiving oil when the oil is agitated during the operation of the engine, and a second conduit extending from said receptacle to a point below the pressure transmitting level, said second conduit having an open upper end above the upper edge of said receptacle, an opening below the upper edge and above the bottom of said receptacle, and an opening beneath said air chamber.

4. A device for indicating the depth of oil in an engine crank case and having an air chamber within said crank case and communicating with the oil at a pressure transmitting level, a pressure gauge, a pressure transmitting conduit in communication with said gauge and the upper portion of said air chamber, a receptacle within said crank case and above the free surface of the oil for receiving the oil during the operation of the engine, means for directing oil collecting upon a portion of the crank case wall to said receptacle, and a second conduit extending from said receptacle to a point below the pressure transmitting level, said second conduit having an open upper end above the upper edge of said receptacle, an opening below the upper edge and above the bottom of said receptacle, and an opening beneath said air chamber.

5. A device for indicating the depth of oil in an engine crank case and having a pressure gauge above the normal level of oil in the crank case, a pressure transmitting conduit extending downwardly from said pressure gauge into the oil in the crank case and having an opening in its lower end for placing said conduit in communication with the oil at a pressure transmitting level, and means dependent upon the operation of a movable part of the engine and adapted to catch oil discharged by the movable part for replenishing said pressure transmitting conduit with air constantly during the operation of the engine and during a period subsequent to the operation of the engine.

6. A device for indicating the depth of oil in an engine crank case and having a pressure gauge above the normal level of oil in the crank case, a pressure transmitting conduit extending downwardly from said gauge into the oil in the crank case and having an opening at its lower end for placing the conduit in communication with the oil at a pressure transmitting level, a receptacle within the crank case at an elevation above that of the free surface of the oil and having an opening in its upper portion for receiving oil when the oil is agitated during the operation of the engine, and a pair of conduits extending from said receptacle, each having an opening for the passage of air, and an opening at its lower end for the escape of oil and air passing therethrough and arranged with respect to said pressure transmitting conduit so that air from both conduits may enter the latter, one of said pair of conduits having an opening within the upper portion of the receptacle for the passage of oil and the other of said pair of conduits having an opening within the lower portion of the receptacle for the passage of oil.

7. A device for indicating the depth of oil in an engine crank case and having a U-shaped hydrostatic gauge above the normal level of oil in the crank case, a pressure transmitting conduit extending downwardly from one leg of said gauge into the oil in the crank case and having an opening at its lower end for placing said conduit in communication with the oil at a pressure transmitting level, means for replenishing said pressure transmitting conduit with air, and a pressure equalizing conduit extending from the other leg of said gauge into the crank case through a side wall thereof above the normal level of the oil therein and having an enlarged chamber within the crank case communicating therewith through an opening in its lower side.

8. A device for indicating the depth of oil in a crank case and having a pressure gauge above the normal level of oil in the crank case, a pressure transmitting conduit extending downwardly from said gauge into the oil in the crank case and having an opening at its lower end for placing said conduit in communication with the oil at a pressure transmitting level, a receptacle within the case at an elevation above that of the free surface of the oil and having a portion arranged adjacent one wall of the crank case for directing oil into the receptacle during the operation of the engine and a second conduit extending from said receptacle and having an opening within the receptacle for the passage of oil, an opening outside the receptacle for the passage of air and an opening at its lower end below the pressure transmitting level and arranged with respect to said pressure transmitting conduit so that air passing through said second conduit may enter said pressure transmitting conduit.

9. A device for indicating the depth of oil in an engine crank case and having a U-shaped pressure gauge above the normal level of oil in the crank case, a pressure transmitting conduit extending downwardly from one leg of said gauge into the oil in the crank case and having an opening at its lower end for placing said conduit in communication with the oil at a pressure transmitting level, means for replenishing said pressure transmitting conduit with air, and a pressure equalizing conduit extending from the other leg of said gauge into the crank case above the normal level of the oil therein, said pressure transmitting and equalizing conduits each having connecting portions outside and extending through a wall of the crank case and upwardly therefrom for respectively condensing vapors therein and directing the condensate to the interior of the crank case.

10. A device for indicating the depth of oil in an engine crank case and having a pressure gauge above the free surface of the oil in the crank case, a pressure transmitting conduit extending downwardly into the oil in the crank case and having an opening at its lower end for placing said conduit in communication with the oil at a pressure transmitting level, a receptacle within the crank case at an elevation above that of the free surface of the oil and having an opening in its upper portion and adapted to receive through the opening oil discharged by the movable part of the engine during its operation and a second conduit communicating with the interior of said receptacle and extending downwardly therefrom and provided with means above the point of communication of said second conduit with the interior of said receptacle for placing said second conduit in communication with the air and also provided with an opening at its lower end below the pressure transmitting level and arranged with respect to said pressure transmitting conduit so that air passing through said second conduit may enter said pressure transmitting conduit.

11. A device for indicating the depth of oil in an engine crank case and having a pressure gauge above the normal level of oil in the crank case, a pressure transmitting conduit extending downwardly from said gauge into the oil in the crank case and having an opening at its lower end for placing said conduit in communication with the oil at a pressure transmitting level, a cup-shaped receptacle within the crank case at an elevation above that of the free surface of the oil and having an oil collecting portion extending upwardly from the upper edge of said receptacle to a wall of the crank case for collecting and conducting oil to said receptacle, and a second conduit communicating with the interior of said receptacle and having an opening outside said receptacle for the passage of air and also an opening at its lower end below the pressure transmitting level and arranged with respect to said pressure transmitting conduit so that air passing through said second conduit may enter said pressure transmitting conduit.

ARTHUR N. GUSTINE.